J. W. SENER.
Coffee Pot.
No. 23,715.  Patented April 19, 1859.
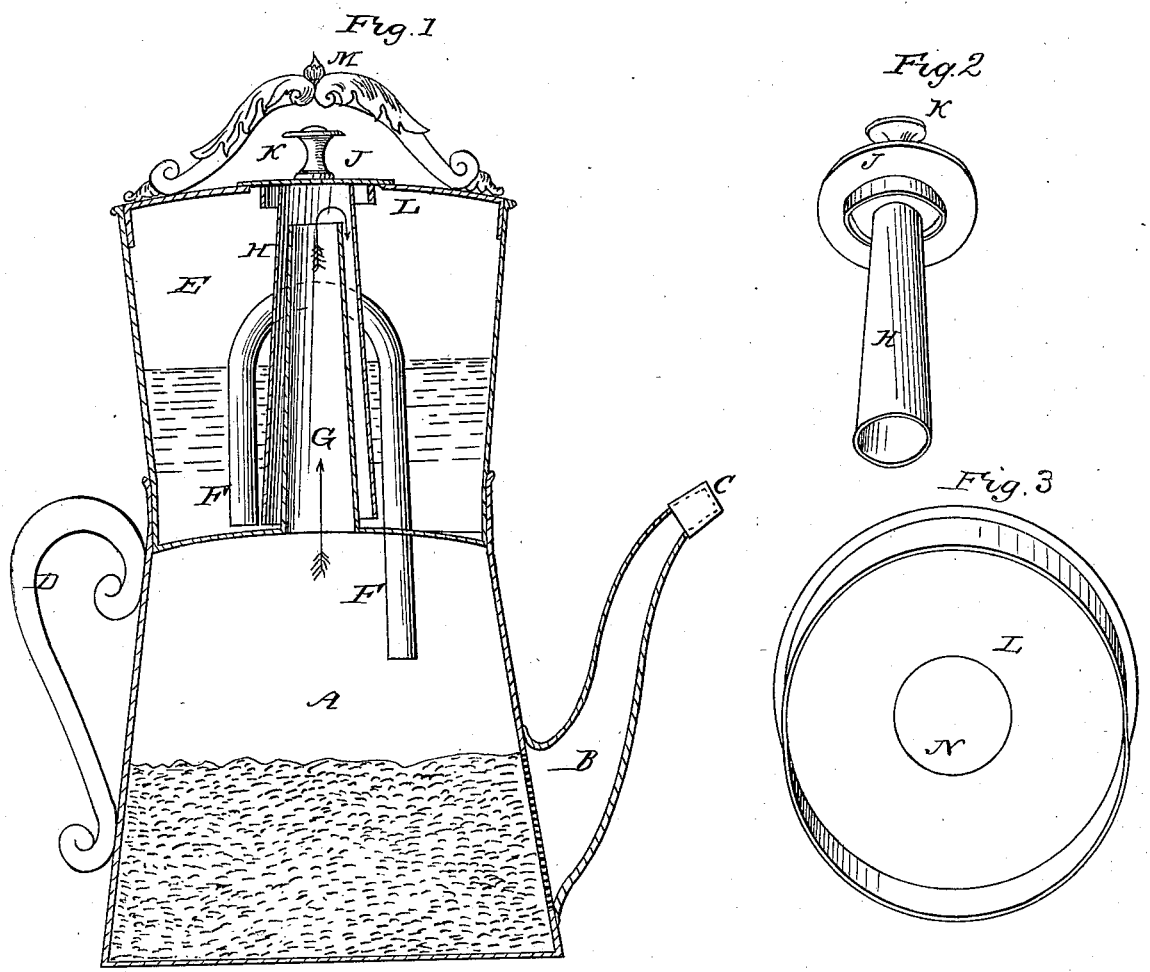

UNITED STATES PATENT OFFICE.

J. W. SENER, OF FREDERICKSBURG, VIRGINIA.

TEA AND COFFEE POT.

Specification of Letters Patent No. 23,715, dated April 19, 1859.

*To all whom it may concern:*

Be it known that I, J. W. SENER, of Fredericksburg, in the State of Virginia, have invented an Improvement in Condensing Tea and Coffee Pots; and I do hereby declare the following to be a correct description of the same, reference being had to the accompanying drawings, in which—

Figure 1 is a vertical central section of my improved pot; Fig. 2 is a perspective view of the safety valve with cap attached, and Fig. 3 a view of the lid of the condensing chamber, seen from below.

The same part is marked by the same letter of reference wherever it occurs.

In the drawings A marks the body of the pot; B the spout; C cover of spout; D, handle; E condensing chamber; F siphon; G, steam tube; H, cap or sleeve descending over tube G; J, safety valve; K knob of valve; L, lid of condensing chamber; M handle of lid; N, hole in lid L through which cap H descends and the steam escapes.

My invention consists in a modification of the Waite and Sener coffee pot, known as the "Old Dominion," for the purpose of preventing accidents, from too great pressure of steam, which may occur in that utensil, when the siphons, from any cause, become obstructed.

The principle of operation of this invention, so far as the making of a decoction is concerned, does not differ from that of the Old Dominion coffee pot. It possesses the merits of that invention, with the additional advantage of perfect security from explosion.

The utensil mainly consists of a lower chamber A in which the steam is generated, and an upper chamber E in which it is condensed. Instead of conducting the steam from the lower to the upper chamber through a small siphon, as in the "Old Dominion" pot, I make use of the large tube G, over which the cap H passes forming an annular space around it, as clearly shown in Fig. 1. The steam then takes the course shown by the arrows, passing up the tube G, and down the annular space, into the cold water in E where it is condensed. If the steam is generated more rapidly than it can be condensed, it will force its way into chamber E which would be subjected to a pressure which might become dangerous if not relieved. The safety valve J, which is seated upon lid L as shown, having been previously weighted to the degree of pressure the pot can safely endure, rises when that limit is surpassed, and suffers the steam to escape till the pressure is sufficiently reduced. Both the upper and lower chambers are simultaneously relieved for the cap or sleeve H, being attached to the valve J, rises with it, and relieves the pressure of the condensing water in E, and thus facilitates the rapid passage of steam from A to E till the pressures in both become equal. The valve J may be weighted by attaching weights to H, or in any other convenient manner. The siphon F performs the same office as in the "Old Dominion" pot, that of drawing the water from chamber E, into the body of the pot, when it has risen to the level of the top of its bend.

Having thus fully described my invention what I claim and desire to secure by Letters Patent is—

The safety apparatus hereinbefore described, the same consisting in the combination of the tube G with the cap H and valve J, constructed and operating as and for the purpose specified.

The above specification signed and witnessed this seventeenth day of February A. D. 1859.

J. W. SENER.

Witnesses:
EDW. F. BROWN,
CHAS. F. STANSBURY.